(12) United States Patent
Kim et al.

(10) Patent No.: US 7,410,208 B2
(45) Date of Patent: Aug. 12, 2008

(54) PACKAGE TRAY OF VEHICLES AND REINFORCING STRUCTURE THEREOF

(75) Inventors: Ki Chang Kim, Suwon-si (KR); Jae Kap Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 434 days.

(21) Appl. No.: 11/244,259

(22) Filed: Oct. 5, 2005

(65) Prior Publication Data
US 2007/0075568 A1 Apr. 5, 2007

(51) Int. Cl.
*B60J 7/00* (2006.01)
(52) U.S. Cl. .................................. 296/193.08
(58) Field of Classification Search ........... 296/193.08, 296/287.05, 193.02, 146.6
See application file for complete search history.

(56) References Cited

U.S. PATENT DOCUMENTS

| | | | | |
|---|---|---|---|---|
| 4,514,599 A | * | 4/1985 | Yanagishima et al. | 381/152 |
| 5,076,631 A | * | 12/1991 | Lord, Jr. | 296/37.8 |
| 5,171,054 A | * | 12/1992 | Wilson | 296/193.04 |
| 5,731,551 A | * | 3/1998 | Petrucci | 181/150 |
| 7,328,928 B2 | * | 2/2008 | Aizawa et al. | 296/24.4 |

* cited by examiner

*Primary Examiner*—Kiran B. Patel
(74) *Attorney, Agent, or Firm*—Morgan Lewis & Bockius LLP

(57) ABSTRACT

A package tray of a vehicle includes a first reinforcing member installed to a woofer mount of a center panel and supported by a rear member and a second reinforcing member installed to the rear member to correspond to the woofer mount of the center panel in the front-to-rear direction. Thus, stiffness is increased so that noise, caused by vibration and/or tremble generated when a woofer outputs sound waves, can be minimized.

8 Claims, 4 Drawing Sheets

PACKAGE TRAY OF VEHICLES AND REINFORCING STRUCTURE THEREOF

BACKGROUND OF THE INVENTION (a) Field of the Invention

The present invention relates to a package tray of a vehicle and a reinforcing structure thereof, and more particularly, to a package tray of a vehicle and a reinforcing structure thereof in which noise caused by vibration is reduced.

(b) Description of the Related Art

Generally, accessories, such as car audio equipment, an air purifier, and so on, are provided in vehicles for the purpose of improved traveling comfort and convenience.

Car audio equipment, in order to satisfy consumers' demands of enjoying sounds in wide and various bands, is being developed, and generally transmits sound waves through main speakers and a tweeter and a woofer installed in a package tray. The woofer outputs mid-frequency sound waves and the tweeter outputs high-frequency sound waves.

However, in many conventional package trays, considerable vibration, generated when a woofer mounted therein outputs sound waves, causes a center panel to vibrate, and, due to local stiffness deterioration of the woofer mount and the rear member, noise is generated by the vibration.

SUMMARY OF THE INVENTION

Embodiments of the present invention provide a package tray of a vehicle having an improved structure of increasing local stiffness of a woofer and a rear member such that noise caused by vibration generated when the woofer outputs sound waves is reduced. Embodiments of the present invention may also restrain vibration by distributing vibration generated by a woofer when the woofer outputs sound waves to a rear member.

In one exemplary embodiment of the present invention, a package tray of a vehicle includes a center panel having at least one accessory mount, front and rear members respectively installed at the front and rear sides of the center panel, and at least one first reinforcing member installed to a portion of the center panel where an accessory hole is not formed and forming a closed space between the center panel and the first reinforcing members.

Preferably, an air purifier may be installed to the accessory mount of the center panel.

Preferably, a woofer may be installed to the accessory mount of the center panel.

The rear member may include a second reinforcing member installed to a portion corresponding to the accessory mount of the center panel in which the woofer is installed, in the front-to-rear direction.

The second reinforcing member may have a diaphragm and be installed to the rear member.

Moreover, the rear member may include a second reinforcing member installed to a portion corresponding to the accessory mounting of the center panel in the front-to-rear direction.

Preferably, the first reinforcing members are respectively installed at the right and left sides of the accessory mount of the center panel in which the woofer is installed.

Preferably, the rear sides of the first reinforcing members are inserted into the rear member such that the first reinforcing members are connected to the rear member.

In a further exemplary embodiment of the present invention, a reinforcing structure of a package tray of a vehicle includes a center panel in which a woofer mount and an air purifier mount are installed, and front and rear members respectively installed at the front and rear sides of the center panel, the reinforcing structure including two first reinforcing members installed at the right and left sides of the woofer mount of the center panel and coupled with the center panel to form sealed spaces between the first reinforcing members and the center panel, and a diaphragmed second reinforcing member installed to a portion of the rear member corresponding to the woofer mount of the center panel in the front-to-rear direction.

Preferably, the rear sides of the two first reinforcing members are inserted into the rear member, respectively.

As described above, according to the package tray of a vehicle of the present invention, since local stiffness of the woofer and the rear member of the center panel is increased, vibration and tremble, generated when the woofer outputs sound waves, are restrained and noise is not generated.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
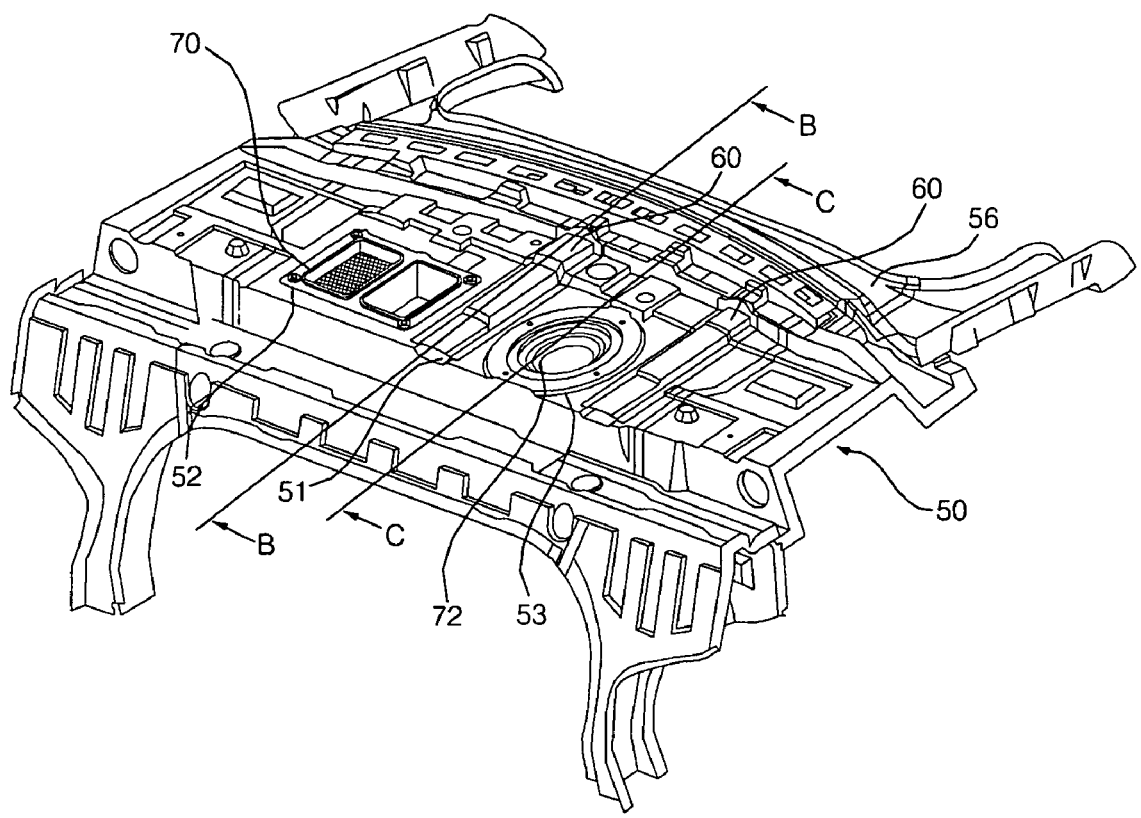
FIG. 1 is a perspective view illustrating a package tray of a vehicle according to an exemplary embodiment of the present invention and a reinforcing structure thereof.
Figure 2:
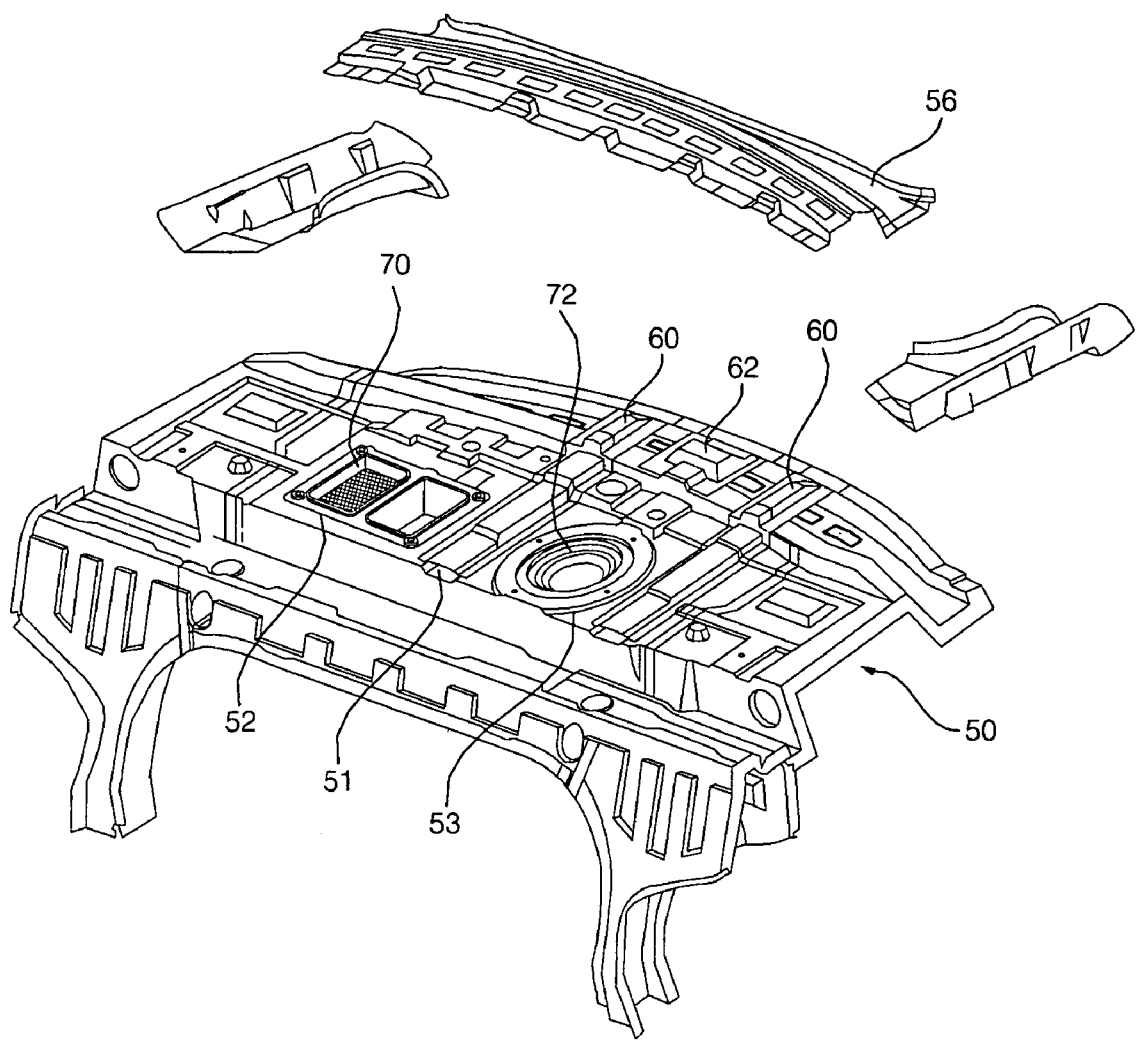
FIG. 2 is an exploded perspective view illustrating the package tray of a vehicle according to an exemplary embodiment of the present invention and the reinforcing structure thereof.
Figure 3:
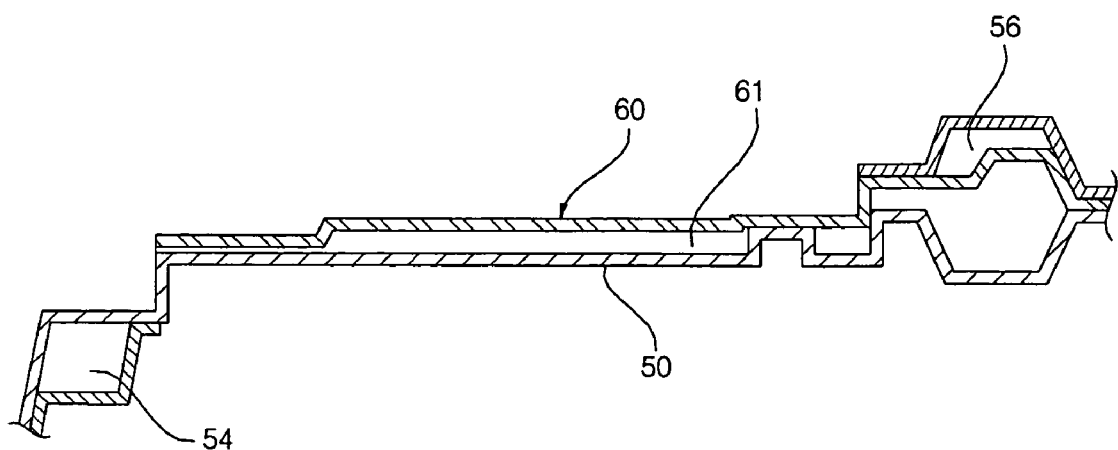
FIG. 3 is a sectional view taken along line B-B of FIG. 1.
Figure 4:
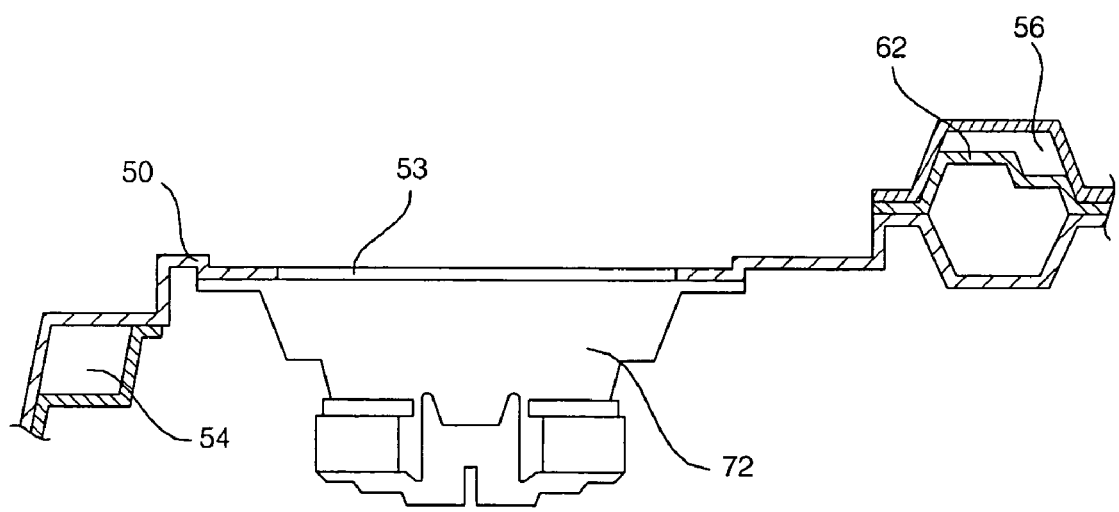
FIG. 4 is a sectional view taken along line C-C of FIG. 1.

Hereinafter, embodiments of the present invention will be described with reference to the accompanying drawings.

As shown in FIGS. 1 to 4, a package tray of a vehicle according to an exemplary embodiment of the present invention, includes a center panel 50 having at least one accessory mounting, front and rear members 54 and 56 respectively installed to the front and rear sides of the center panel 50, and at least one first reinforcing members 60 installed to portions of the center panel 50. The center panel 50 may have grooves 51 formed in places where the first reinforcing members 60 are installed.

The accessory mounting of the center panel 50 includes an air purifier mount 52 in which an air purifier 70 is installed, and a woofer mount 53 in which a woofer 72 is installed. The air purifier mount 52 and the woofer mount 53 may be arranged in parallel.

The first reinforcing members 60, in order to increase stiffness of the woofer mount 53, may be installed to the upper side of the woofer mount 53 of the center panel 50. In other words, the first reinforcing members 60 may be disposed at the right and left sides of the woofer mount 53, respectively.

The first reinforcing members 60, in order to increase stiffness of the woofer mount 53, may have a predetermined height and a predetermined width such that a predetermined space 61 between the first reinforcing members 60 and the center panel 50 is formed. The predetermined space 61 between the first reinforcing members 60 and the center panel 50 may be sealed.

Additionally, the first reinforcing members 60 may be extended in the longitudinal direction, that is, in the front-to-rear direction. Particularly, the first reinforcing members 60 are supported by the rear member 56 and are connected to the rear member 56 to increase stiffness of the rear member 56. In other words, the first reinforcing members 60 may be structured such that the rear ends thereof are inserted into the rear member 56. The first reinforcing members 60 may be coupled with the center panel 50 and the rear member 56 by welding or other suitable means.

The rear member 56, in order to increase stiffness, may include a second reinforcing member 62 installed to a portion corresponding to at least the woofer mount 53 of the accessory mounting of the center panel 50 in the front-to-rear direction. The second reinforcing member 62, in order to maximize stiffness of the rear member 56, may have a diaphragm dividing the internal space of the rear member 56 into an upper space and a lower space.

Operation and effects of the package tray of a vehicle according to an exemplary embodiment of the present invention and the reinforcing structure thereof will be described in detail as follows.

Since the first reinforcing member 60 is installed to the woofer mount 53 of the center panel 50, stiffness of the woofer mount 53 of the center panel 50 is increased. Moreover, since the first reinforcing member 60 is securely supported by the rear member 56, stiffness of the woofer mount 53 of the center panel 50 is increased and vibration of the woofer mount 53 of the center panel 50 is distributed to the rear member 56, thereby restraining the vibration. Additionally, since the second reinforcing member 62 is installed to the rear member 56 such that the rear member 56 corresponds to the woofer mount 53 of the center panel 50 in the front-to-rear direction, stiffness of the rear member 56 may be increased.

Figure 5:
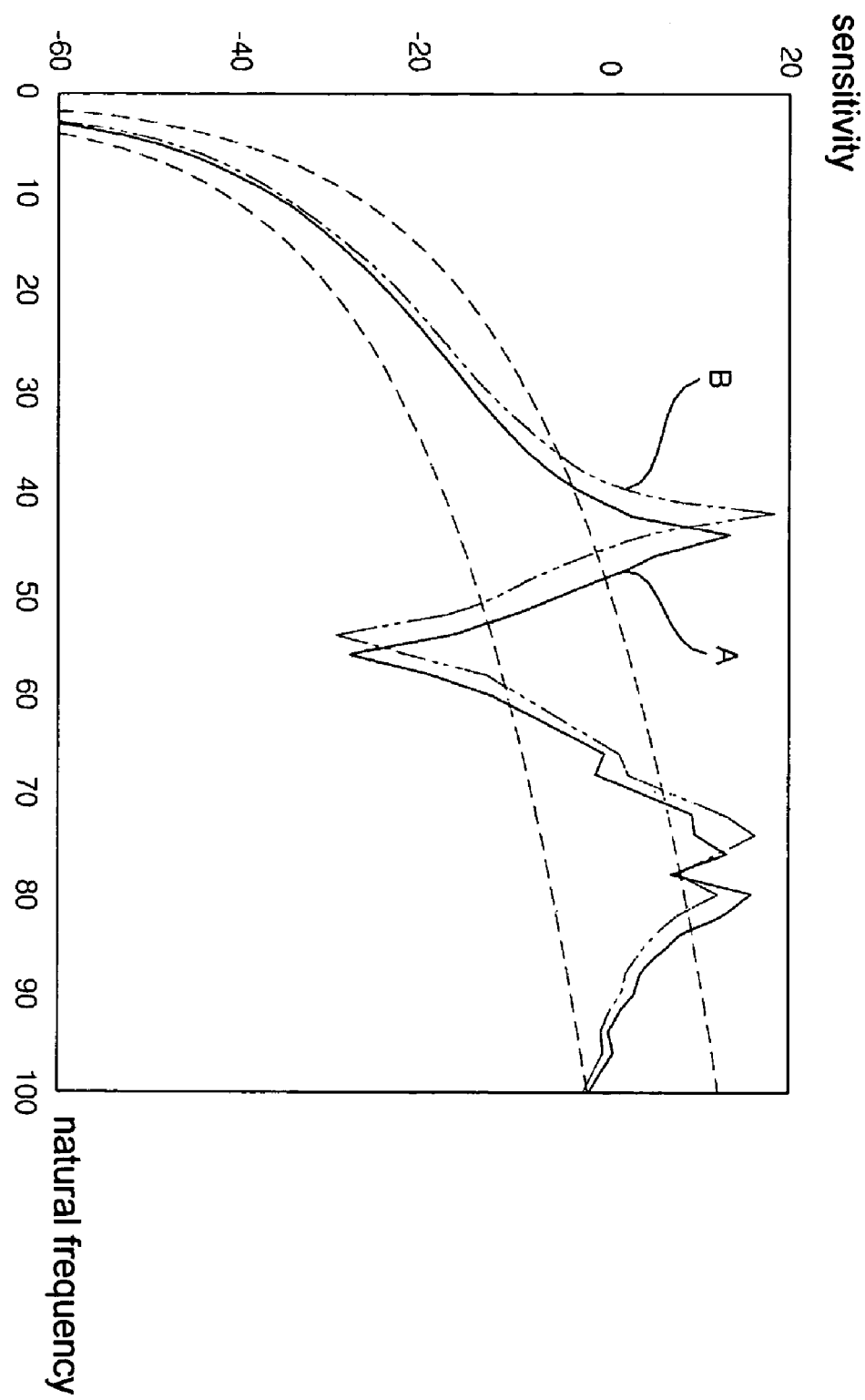
FIG. 5 is a graph illustrating sensitivities with respect to natural frequencies of the package tray of a vehicle according to an exemplary embodiment of the present invention and a conventional package tray.

FIG. 5 is a graph illustrating sensitivities with respect to natural frequencies of the package tray (A) of a vehicle according to a preferred embodiment of the present invention and a conventional package tray (B). Since stiffness of the woofer mount 53 and the rear member 56 of the center panel 50 is increased, it can be understood that vibration and tremble, generated when the woofer 72 outputs sound waves, are reduced. Thus, noise, caused by the vibration and/or tremble generated when the woofer 72 outputs sound waves, can be restrained and the output range of the woofer 72 can be broader.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A package tray of a vehicle, comprising:
   a center panel having at least one accessory mount;
   front and rear members respectively installed at front and rear sides of the center panel; and
   at least one first reinforcing member installed on a portion of the center panel spaced from an accessory hole and forming a closed space between the center panel and at least one first reinforcing member.

2. The package tray of a vehicle as set forth in claim 1, wherein an air purifier is installed on the accessory mount of the center panel.

3. The package tray of a vehicle as set forth in claim 1, wherein a woofer is installed on the accessory mount of the center panel.

4. The package tray of a vehicle as set forth in claim 3, wherein the rear member includes a second reinforcing member installed on a portion corresponding to the accessory mount of the center panel in which the woofer is installed, in a front-to-rear direction.

5. The package tray of a vehicle as set forth in claim 4, wherein the second reinforcing member has a diaphragm and is secured to the rear member.

6. The package tray of a vehicle as set forth in claim 1, wherein the rear member includes a second reinforcing member installed on a portion corresponding to the accessory mount of the center panel in a front-to-rear direction.

7. The package tray of a vehicle as set forth in claim 3, wherein at lest one first reinforcing member comprises at least two members respectively installed at right and left sides of the accessory mount of the center panel in which the woofer is installed.

8. The package tray of a vehicle as set forth in claim 1, wherein the rear side of at least one first reinforcing member is inserted into the rear member such that said first reinforcing member is connected to the rear member.

* * * * *